United States Patent Office 3,421,059
Patented Jan. 7, 1969

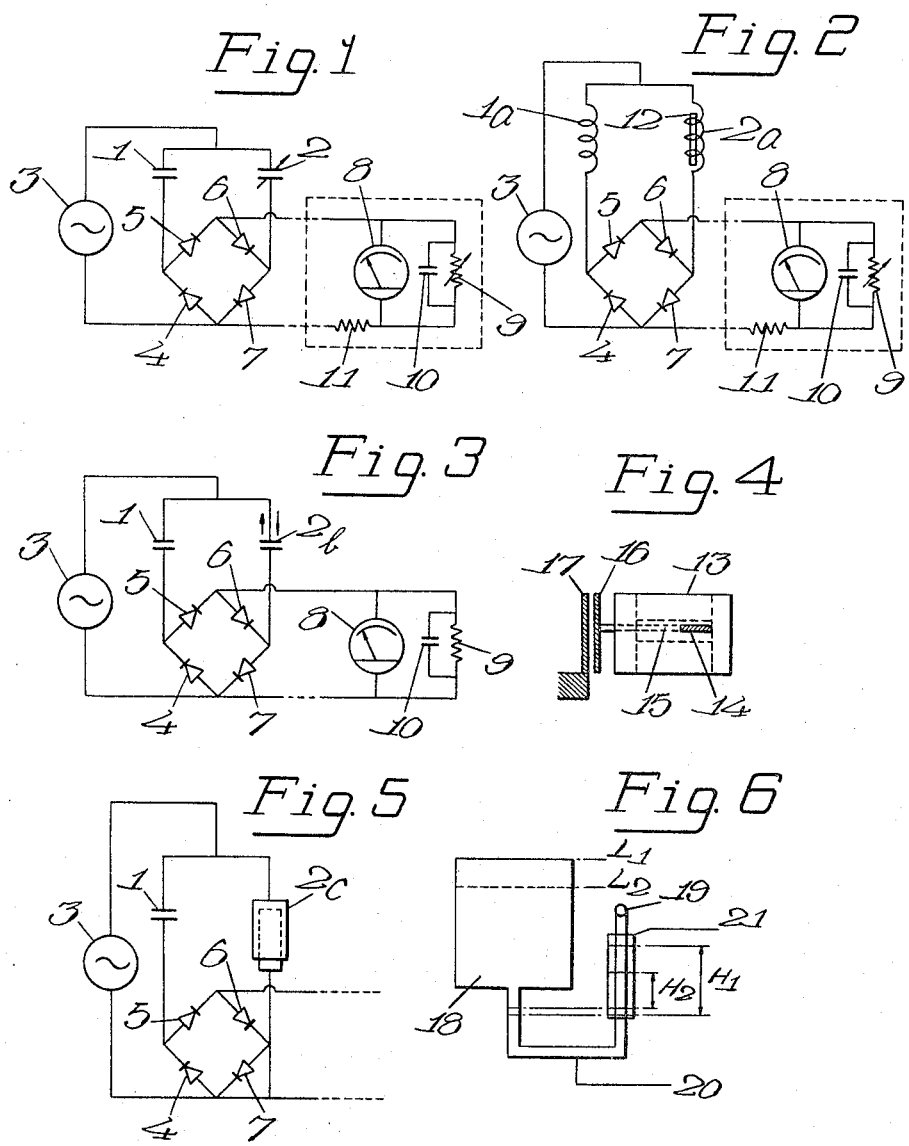

3,421,059
ELECTRIC REMOTE CONTROL SYSTEM FOR SUPERVISING A VARIABLE PHYSICAL MAGNITUDE
Tetsuo Takahashi, 7345 Kugenuma, Fujisawa-shi, Kanagawa-ken, Japan
Filed Nov. 24, 1964, Ser. No. 413,425
Claims priority, application Japan, Dec. 14, 1963, 38/67,192; Mar. 28, 1964, 39/16,971; June 3, 1964, 39/31,123
U.S. Cl. 318—18     4 Claims
Int. Cl. G05b 1/00; 3/00

ABSTRACT OF THE DISCLOSURE

There is disclosed an electric control system for supervising a variable physical magnitude by remote control. The control system comprises a constant A-C voltage source having two terminals, a reference circuit component and a variable circuit component responsive to changes in the physical magnitude to be supervised. Each of the two circuit components has two terminals, one terminal of each component being connected to one terminal of said voltage source. A four-arm rectifying bridge, all rectifiers of which pass current in the same direction, is connected at two of its opposite points to the other terminals of the circuit components and at one of its remaining points to the other terminal of the voltage source. A compensating impedance means and an indicating means for indicating the physical magnitude are serially connected between said one point of the bridge and the remaining point thereof. A second impedance means is connected in parallel with the compensating impedance means for varying the indicated range of the physical magnitude.

---

This invention relates to an electric control system for remote indication and automatic control.

Hitherto the need for remote indication and automatic control has been very great and various devices were put to practical use. However, remote indicating devices as now known require a complicated construction and are expensive, or affect the pilot meter so that the indications thereof are no longer correct. In selsyn motor systems, remote indication from a pilot meter is impossible when the torque of the pilot meter is small. Similarly automatic control devices as now known require complicated construction and are expensive, for instance on-off control devices as now known.

The present invention has for its object to provide an electric follow-up control system which is simple in construction and low in cost and in which a changed value of a physical quantity is accurately transmitted to a remote place without affecting the pilot instrument and varying its indication value.

Another object of the present invention is to provide an electric control system for automatically controlling a physical quantity present at an indicator in accordance with a selected quantity.

Figure 7:
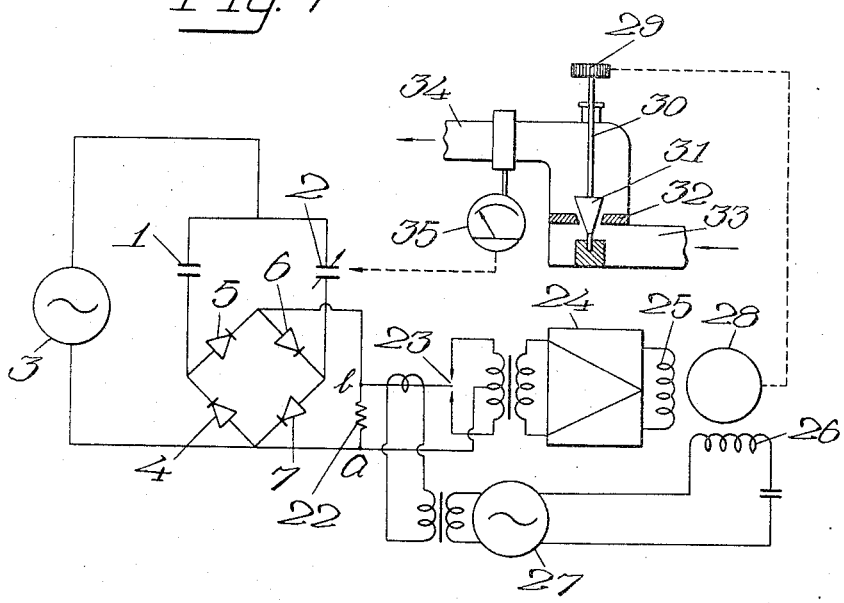
Figure 8:
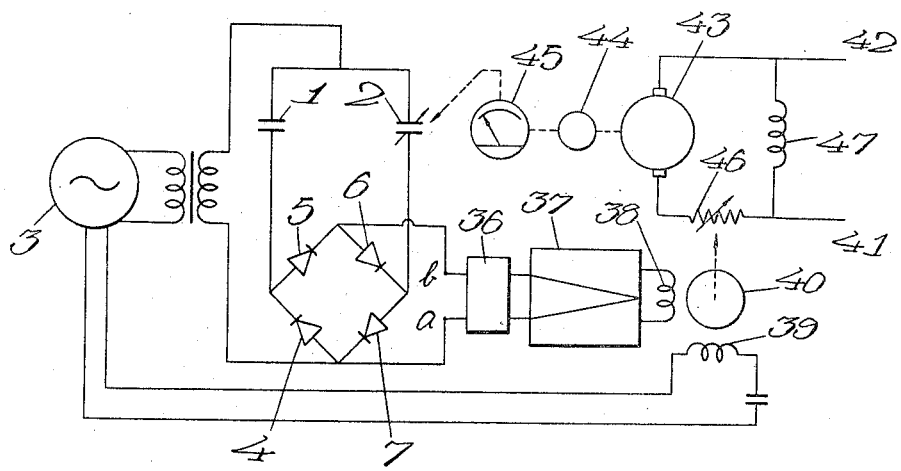

Above and other objects and advantages of the present invention will become apparent from the following detailed description, taken in conjunction with the accompanying drawings which show, by way of example, embodiments of the present invention, in which:

FIG. 1 is a circuit diagram illustrating the principle of a remote indicating device in conjunction with a condenser, FIG. 2 is a circuit diagram illustrating the principle of a remote indicating device in conjunction with an inductance, FIG. 3 shows a circuit of a remote indicating device having another variable condenser, FIG. 4 is a diagrammatic view of the condenser, FIG. 5 shows a circuit of a remote indicating device having a further variable condenser, FIG. 6 is a diagram of an embodiment of this invention employed for a liquid level remote indicating device, FIG. 7 is a circuit diagram illustrating an automatic control device according to this invention which has been applied to automatic control of the volume of a liquid flow, and FIG. 8 is a diagram showing a circuit which is applied for speed control of a direct current motor.

Referring now to FIG. 1, 1 shows a condenser of fixed capacity, 2 a condenser of variable capacity, and 3 an alternating current source of constant voltage. 4, 5, 6 and 7 are rectifiers in bridge connection, 8 is an indicator, 9 is a variable resistance for adjusting purpose, 10 a condenser for alternating current, and 11 a resistance for compensation of temperature. The variable condenser 2 has a circular rotor secured to a shaft which coacts with a pointer or shaft of a pilot meter, and a stator situated in a position with reference to the rotor so that the area at which the rotor and the stator overlap and thus the capacity of condenser increases or decreases in proportion to an angular displacement of the pointer.

When the upper terminal of the power source 3 is positive, positive half-wave current flows through condenser, rectifier 5, indicator 8 and turns the pointer thereof in positive direction and the current returns to the power source 3. When the lower terminal of the power source 3 is positive, the current flows from the lower terminal of the power source 3 into the indicator 8, turns the pointer in reverse direction, passes through the rectifier 6 and the variable condenser 2. The current then returns to the power source 3. At this moment the two currents, the one passing through 2, 7 and the other passing through 4, 1, do not appear on the indicator 8.

In the half cycle period where the upper terminal of the power source 3 is positive, the following equation is obtained, denoting voltage as V, capacity of condenser 1 as C1, and current passing through the condenser as $i1$.

$$i1 = KVC1\omega \qquad (1)$$

where $\omega = 2\pi f$; $f$ = frequency of power source; K = constant in half-wave rectifying.

During the half-cycle period where the lower terminal of the power source 3 is positive, the following equation will be established if half-wave current flowing through the condenser 2 is given as $i2$ and electric capacity of the condenser 2 as C2.

$$i2 = KVC2\omega \qquad (2)$$

where if $i1$ is positive, $i2$ would be negative. The difference charge of these two is accumulated in the condenser 10 to move the indicator 8. Therefore, if the indicated value of the indicator is taken as $\theta$ $$\theta = i1 - i2 = KV\omega(C1 - C2) \qquad (3)$$

Therefore, deflection of the indicator 8 is proportional to the difference of the capacities of the condensers 1, 2. Since the pointer of the pilot meter is presumed to be connected to the rotor of the condenser 2 for remotely indicating the indicated quantity, the deflection of the pointer of the pilot meter is to a variation of the capacity in the condenser 2. If voltage and frequency of the electric source 3 and the capacity C1 of the condenser 1 are constant and the capacity of the condenser 2 is fixed the pointer of the indicator 8 is at zero since $i1 = i2$ according to the Equation 3

$$C1 = C2 \qquad (4)$$

If the pointer of the pilot meter is turned by angle $\theta$ to indicate the measured quantity, the rotor of the condensor 2 cooperating with the pointer would also turn by angle $\theta$ and the capacity of the condenser 2 would increase in proportion to angle $\theta$. If the amount of increase are to be $\Delta C2$.

$$\theta \infty \Delta C2 \qquad (5)$$

Accordingly $$i2 = KV\omega(C2 + \Delta C2) \qquad (6)$$

Even though the pointer turns through angle $\theta$, $i1$ would not change, but $i2$ would change.

At this moment if $i2$ is $i2'$ $$i1 - i2' = KVC1\omega - KV\omega(C2 + \Delta C2) = KV\omega\Delta C2 \qquad (7)$$

Since $i1 - i2'$ is an indicated value of the indicator 8 and $V\omega K$ is constant, the Equation 7 shows that the indicated value is proportional to $\Delta C2$, which means that the indication of the pilot meter as shown by the pointer thereof appears on the indicator 8.

When the pilot meter is a Bourdon-tube gage displacement at the tip of the Bourdon-tube is transmitted to the gear through the sector to drive the pointer shaft and when the pilot meter is a water gage wherein water level in a tank is shown on a scale by a pointer, said pointer may be attached to a rack and pinion to turn the pointer shaft. Therefore by moving the rotor of the condenser 2 proportionately to the indicated value of the pilot meter, the same indication as shown by the pilot meter may be obtained on the indicator 8.

By experiments according to this invention, it was found that if a disc type variable condenser is used for the condenser 2 and the gap thereof is fixed in case the original meter has equal distance scales, the indication of the indicator 8 would accurately coincide with the indication of the pilot meter.

It will be easily understood from the Equation 3 that if the rectifiers are arranged in bridge form and all oriented in clockwise direction as shown in FIG. 1, the polarity of electric current coming in the indicator 8 in case of $C2>C1$ would be positive at the lower point and negative at the upper point.

If, as shown in FIG. 2, inductances $1a$, $2a$ be used instead of condensers 1, 2 and an iron core 12 is pulled into or out of the inductance $2a$ so as to change the impedance without regard to direct current resistance, the electric current $i1$, $i2$ flowing through the coils $1a$, $2a$ would be $$i1 = \frac{KV}{\omega L1}$$

$$i2 = \frac{KV}{\omega L2} \qquad (8)$$

where the inductance of coil 1 is L1 and that of coil $2a$ is L2.

If at the first indication of the inductor 8 be set at zero when $L1=L2$, the inductance would be increased by $\Delta L$ and the current changed to $i2$; when the core 12 is pulled into coil $2a$ with the movement of the pointer of the pilot meter, there would be $$i2' = \frac{KV}{\omega(L2+\Delta L)} \qquad (9)$$

$$i1 - i2' = \frac{KV}{\omega L1} - \frac{KV}{\omega(L2+\Delta L)}$$

$$= \frac{KV}{\omega} \frac{L}{L1(L2'+\Delta L)} \qquad (10)$$

If $L1=L2=L$
The Equation 10 will be $$i1 - i2' = \frac{KV}{\omega} \frac{\Delta L}{L(L+\Delta L)} \qquad (11)$$

If $\Delta L$ is much smaller than L $$i1 - i2' \doteq \frac{KV\Delta L}{\omega L2} \qquad (12)$$

$i1-i2'$ is the amount which the pointer of the indicator 8 moves proportionally to the movement of the pilot meter.

If an electrical circuit is set up to measure a physical quantity with a long conductor leading to a remote measuring room and the indicator 8 including a temperature compensation resistance 11 for the conductor is located there, it may well be possible to read the physical quantity at a remote place. Further by setting some of the condensers in FIG. 1 and switching them over one after another, various types of physical quantities may be read out at a remote place by means of one set of electric circuits. Range control in order to coincide to a maximum value of the pilot meter with that of the indicator 8 can be obtained by variable resistance 9 when the indicator 8, the condenser 2 etc. are located remotely.

Next will be explained a device for directly indicating a variation of a physical quantity. FIG. 3 shows an embodiment in which a variable gap condenser $2b$ is substituted for the rotary variable condenser in FIG. 1, where the condenser $1b$ is the same type as condenser $2b$.

Assuming that the area of a fixed metallic plate and a variable gap metallic plate of the condenser $2b$ is A. the distance between the plates is $d$, inductivity of material between the two plates $\epsilon$ and a constant is $k$, the electric capacity C between the two plates would be $$C = k\epsilon \frac{A}{d} \qquad (13)$$

If A is constant, the relation of $c$ and $d$ would be represented by a hyperbole, because $k\epsilon$ is constant.

FIG. 4 shows an example in which the invention has been applied to a dilatometer. In an electrical furnace 13 was placed a test piece 14. This piece when expanded due to rise of temperature in the electric furnace was taken out of the furnace by a push rod 15. A variable gap metallic plate 16 was fixed on the tip of the rod and spaced apart from plate 16 was a fixed metallic plate 17. Accordingly, as the test piece is expanded with the rise of temperature, the gap between the two metallic plates becomes narrower and the electric capacity is increased.

As shown in FIG. 3 if the electric capacity of the condenser $1b$ is given as C1 and that of the condenser $2b$ as C2 (equal to the metallic plates 16, 17 in FIG. 4) and C1 is changed to C2, at normal temperature, the indicator 8 does not turn because, when the current flowing through C1 is taken as $i1$ and that flowing through C2 as $i2$, there would be $i1=i2$, their directions being opposite to each other. Then $$i1 = KVC1\omega \qquad (14)$$

When the temperature of electric furnace rises to T ° C. and C2 increases by $\Delta C$, whereby $i2$ turns to $i2'$, then $$I1 - i2' = KVC1\omega - KV\omega(C2+\Delta C) \qquad (15)$$

To simplify the Equation 13

$$K\epsilon A = k' = \text{constant} \qquad (16)$$

The Equation 13 would be $$C = \frac{k'}{d} \qquad (17)$$

Therefore:

$$C1 = \frac{k1}{d1}C2 + \Delta C$$

$$= \frac{K'}{d1+\Delta d} \qquad (18)$$

where $\Delta d$ is a variable amount of gap between the two plates due to elongation of the test piece. Accordingly the Equation 15 would be $$i1 - i2' = KV\omega \left\{ \frac{k1}{d1} - \frac{k1}{d1 + \Delta d} \right\}$$

$$= KV\omega k1 \left\{ \frac{d'}{d1(d1 + \Delta d)} \right\} \quad (19)$$

where $\Delta d$ is neglected as minute in comparison with $d1$, $$i1 - i2' = \frac{KV\omega k1 \Delta d}{d1^2} \quad (20)$$

Since $i1 - i2'$ is an indicated amount of the indicator 8, the elongation $\Delta d$ of the test piece can be read out by the indicator 8 at a remote place.

It is also possible, as in FIG. 5, to let the two metallic cylinders, large and small, have a common shaft, the smaller one being inserted into the larger one and one of them being fixed and the other variable to move thereby forming a condenser, and thus to make the same remote indication as heretofore described.

One example of this application will be shown in FIG. 6 in which a variation of the liquid level in the tank 18 is measured. Mercury 20 is put in a glass tube 19 to serve as a movable part of a variable condenser, while on the outside is closely fitted a metallic cylinder 21 to serve as a fixed part. Assuming now that the head, at the moment the level is L1 in the tank, is given as H1, the electric capacity as C21, the head at the moment the level is L2 as H2, the electric capacity as C22, and a balance is made with the condenser 1 at the moment the level is L1, there would be $$C1 = C21$$

With respect to this type of condenser, if the length on which the two cylinders overlap is given as H, the electric capacity C would be $$C \infty H \quad (21)$$

Therefor when the level is lowered to L2 and the current flowing through the condenser is $i2'$, the following equation will be obtained as described before $$i1 - i2' = C1 - C22 \infty H1 - H2 \infty L1 - L2$$

That is $$i1 - i2' \infty L1 - L2 \quad (22)$$

Since $i1 - i2'$ is an indicated amount of the indicator, the level of the tank can be accurately measured at a remote place.

The remote indicating apparatus according to this invention is suitably for a flow meter, a weight meter, a speedometer, an anemometer, a thermometer, a tachometer, a frequency meter, a minute pressure meter, an altimeter, a wind direction meter, a thermobalance meter, an illuminometer, a hygrometer, a differential transformer, etc. The invention can be carried out by addition of a rotor to the pilot meter thereby making the same a condenser. The production costs of an instrument according to the invention are low and if semiconductors are used, an electric power of a few milliwatts is enough for operation thereof. It is very suitable for supervising conditions of flow quantity, temperature and pressure at many places by change-over switches at the control centers in a mill.

The present invention will be explained with respect to an apparatus for automatically controlling a physical quantity to secure a selected amount at all times by working with an indicator indicating the physical quantity.

FIG. 7 illustrates a flow volume control. 1, 2 are condensers having a rotation angle in proportion to their electric capacities, the condenser being used for setting the volume and condenser 2 is assembled into a flow meter with a stator which is fixed and a rotor which is secured to the pointer indicating the flow volume. 3 is an alternating current power. 4, 5, 6, 7 are rectifiers arranged in series in clockwise or counterclockwise direction, 22 is a resistance between the output parts $a$, $b$ of the rectifying circuit, 23 is a DC–AC converter, 24 is an AC amplifier, and 25 and 26 are respectively a control coil and an exciting coil of a servomotor. 27 is an AC source connected to the servomotor and the DC–AC converter. 28 is the rotor of the servomotor. A gear directly connected to rotor shaft meshes with a gear 29 fixed on the shaft of the flow volume control valve body 31. This valve body 31 is in conical form, moves up and down with reference to a valve opening 32 upon rotation of the gear 29, expands or diminishes areas of flow passage of liquid thereby controlling flow volume of liquid. 33, 34 are an inlet and an outlet respectively of a flow pipe. 35 is a flow meter connected to the flow volume detecting device.

In operation of the mechanism, the fluid flows on from the inlet 33 of a flow pipe, runs through the space between the opening 32 and the control valve body 31, further passes through the flow volume detecting device and flows to a point of utilization through the outlet 34. The indication of the flow meter 35 is given as Q, any type of flow meter indicating the flow volume being suitable. Alternating current from the alternating current source 3 is divided by condensers 1, 2 connected in parallel and passes through the rectifiers 7, 4 and 5, resistance 22, and returns to the power source. The relationship of the electric current, condensers and polarity of the electric current is same as illustrated already. When the capacity C1 of the condenser 1 for setting and the capacity C2 of the condenser 2 in the flow meter 35 are equal, there does not appear a direct current output between the output parts $a$, $b$ of the rectifying circuit, which is same as described before in detail. Therefore, in case of $C1 = C2$, or the indicated volume of the flow meter is equal to the setting quantity C1, liquid indicated by Q flows without actuating the DC–AC converter 23, amplifier 24 and rotor 28 of the servo-motor. In case of $C2 > C1$, there is DC output, the point $a$ being positive and the point $b$ negative and, in case of $C2 < C1$, there is DC output, the point $a$ being negative and the point $b$ being positive. That is to say, when C1 and C2 are not equal, there are produced DC outputs of different polarities, respectively at the points $a$, $b$.

In case of $C2 > C1$, if C1 is taken as a setting amount the indicated volume Q is exactly equal to C2 and the flow volume would be too large as compared with the setting quantity. If the servo-circuit or direction of engagement of the gear directly connected to the rotor 28 with the gear 29 fixed on the shaft of the valve body 31 is appropriately selected so as to lower the control valve body 31 and narrow the flow passage, the servo-rotor 28 drives and rotates the gear 29 so as to lower the control valve body 31 thereby narrowing the flow passage. As soon as the $C1 = C2$ is set up, the voltage between $a$, $b$ that is, the driving source becomes zero, so that the servo-motor stops. At this moment, the capacity C1 of the setting condenser 1 and the capacity C2 of the condenser 2 in the flow meter would apparently be equal.

The situation is the opposite when it is $C2 < C1$ where there is generated DC voltage which is negative at the point $a$ and positive at the point $b$, so that phases of current of the control coils 25 of servomotor reverse until the rotor 28 becomes $C2 = C1$, resulting in that the valve body 31 rises and the flow passage is enlarged and the quantity of flow is increased and, when it reaches a predetermined volume (i.e. $C2 = C1$) the action stops.

As condenser 1 for setting has been scaled previously, automatic control of flow quantity may be carried out readily by changing C1 to the setting value. It is also possible to reverse, for avoiding overshooting, the phase of voltage from a generator connected directly to the rotor 28 of servomotor and feed back negatively a proper amount to an adequate point of the amplifier 24.

One embodiment of the present invention which is applied for speed control to DC motor will now be explained with reference to FIG. 8. 1 is a setting condenser, 2 is the condenser built in the rotating indicator having a stator fixed therein and a rotor on the pointer of said indicator and 3 is the alternating current source. Rectifiers 4, 5, 6, 7 represent a bridge of the same construction as in the previous example, 36 is a DC–AC connector, 37 is an AC amplifier, 38, 39, 40 are control coils for a servomotor, exciting coil and rotor, respectively. 41, 42 are DC source terminals of a shunt motor, 43 is a rotor of a motor connected to load and also connected to a small generator 44 driving a rotating indicator 45 for measuring its r.p.m. 46 is a resistance placed in series in the rotor which is so constructed that the effective value of the resistance is increased or decreased while the rotor is sliding on the surface of the rotor 40 when the servomotor is in rotation. 47 is an exciting coil of the shunt motor.

Operation of the apparatus will be explained. If the capacity of the setting condenser 1 be given as C1 and the capacity of the condenser 2 built in the rotation meter 45 rotating with the pointer as C2 when the rotor of the motor is rotating normally, there would be $C1=C2$, and the servomotor will not move as in the previous example so that the resistance 46 remains at a fixed value. A particular case, namely when load is constant and the rotation speed is slowed will now be considered. The relationship of the rotary speed of the shunt motor and the series resistance 46 is such that as the series resistance 46 increases, r.p.m. of motor decrease linearly. The setting condenser C1 will have scales to show r.p.m. and sliding directions of the rotor 40 of servomotor and resistance 46 are fixed so as to reduce resistance 46 when the r.p.m. are increased or when capacity of setting condenser is increased. Then, in order to lower the r.p.m. the setting condenser C1 is lowered to a fixed value and there would be $C1<C2$. In case the direction of arrangement of the rectifiers is clockwise as shown in the figure, the lower point *a* is positive and the upper terminal *b* of output negative which output is converted to AC by the DC–AC inverter 36 letting the rotor 40 of the servomotor to slide so as to increase the resistance 46 through the amplifier 24 and results in the reduction of the r.p.m. Therefore, the capacity of the condenser C2 built in the rotary meter 45 is gradually reduced to become equal to that of the setting condenser C1. Then the DC output between the bridge output *a, b* turns to zero so that the servo-rotor 40 stops and the motor rotates at the previously set r.p.m.

In this manner, if the condenser 1 is set previously to the setting r.p.m. control can be obtained automatically. This enables to carry out speed control of many DC machines of similar type effectively by a single controlling device as in a ship that requires a number of DC machines.

The apparatus according to this invention can also be applied to a series motor, a compound motor and similar generator and it is quite possible to fix r.p.m. with reference to a variation of a load.

The examples as mentioned above show only embodiments of the present invention and the principle of maintaining the entire physical amount to a set amount by automatic control is commonly applicable to any kind of the apparatus having the same purpose. Because of its wide applicability many advantages are provided for the development of modern industrial equipments.

Various modifications can be made within the scope of the following claims.

What I claim is:

1. An electric control system comprising in combination: a constant A-C voltage source having two terminals; a reference circuit component; a variable circuit component responsive to changes in a physical magnitude, each of said circuit components having two terminals, one terminal of said source being connected to one terminal of each of said circuit components; a four-arm rectifying bridge circuit having a rectifier in each arm, all said rectifiers passing current in the same direction, the other terminals of said circuit components being connected to two opposite points of said bridge circuit and the other terminal of said source being connected to one of the two other opposite points of the bridge circuit; a compensating impedance means; an indicating means for indicating said physical magnitude, said indicating means and said impedance means being serially connected between said one opposite point of the bridge circuit and the bridge circuit point opposite thereto; and a further impedance means connected in parallel with said compensating impedance means for varying the rang of the physical magnitude as indicated by said indicating means.

2. An electric control system comprising in combination: a constant A-C voltage source having two terminals; a control circuit component; a variable circuit component responsive to a variable physical magnitude to be supervised, each of said circuit components having two terminals, one terminal of said source being connected to one terminal of each said circuit components; a four-arm rectifying bridge circuit having a rectifier in each arm, all said rectifiers passing current in the same direction, the other terminals of said circuit components being connected to two opposite points of said bridge circuit and the other terminal of said source being connected to one of the two other opposite points of the bridge circuit; a D-C to A-C inverter means for setting said variable circuit component, said inverter means being connected to said one opposite point of the bridge circuit and the point of the bridge circuit opposite to said one point; servo motor means coupled to said inverter means to operate the same for varying the setting of said variable circuit component; and control means arranged to be controlled by said variable physical magnitude and controlling said servo motor means to effect setting of the variable circuit component in accordance with the value of said physical magnitude.

3. The control system according to claim 1 wherein said reference circuit component comprises a fixed condenser and said variable circuit component a variable condenser.

4. The control system according to claim 1 wherein said reference circuit comprises an inductance means having a fixed inductance value and said variable circuit component a coil and a ferrous core lengthwise displaceable within said coil to vary the inductance value of said coil.

References Cited

UNITED STATES PATENTS

| | | | |
|---|---|---|---|
| 2,641,931 | 6/1953 | Wild | 318—29 XR |
| 3,015,053 | 12/1961 | Zdzieborski | 318—28 |
| 3,080,513 | 3/1963 | Edwards | 318—28 |
| 3,085,194 | 4/1963 | Revesz | 318—29 XR |
| 3,135,901 | 6/1964 | Godier | 318—29 |

BENJAMIN DOBECK, *Primary Examiner.*

U.S. Cl. X.R.

318—490; 324—99